United States Patent
Ekbatani et al.

(10) Patent No.: US 8,634,777 B2
(45) Date of Patent: Jan. 21, 2014

(54) PAIRING WITH DIRECTIONAL CODE SEQUENCE

(75) Inventors: Siavash Ekbatani, Laguna Niguel, CA (US); Christopher Hansen, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 101 days.

(21) Appl. No.: 13/245,277

(22) Filed: Sep. 26, 2011

(65) Prior Publication Data

US 2013/0078923 A1 Mar. 28, 2013

(51) Int. Cl.
*H04B 7/00* (2006.01)

(52) U.S. Cl.
USPC ........ 455/41.2; 370/270; 380/270; 340/539.1

(58) Field of Classification Search
USPC ........................................ 455/41.2
See application file for complete search history.

(56) References Cited

U.S. PATENT DOCUMENTS

| | | | | |
|---|---|---|---|---|
| 5,231,634 A * | 7/1993 | Giles et al. | | 370/348 |
| 6,643,469 B1 * | 11/2003 | Gfeller et al. | | 398/162 |
| 7,822,384 B2 * | 10/2010 | Anschutz et al. | | 455/41.2 |
| 7,881,671 B2 * | 2/2011 | Sayeed et al. | | 455/67.11 |
| 8,219,028 B1 * | 7/2012 | Flamholz | | 455/41.2 |
| 8,219,891 B2 * | 7/2012 | Lakkis | | 714/776 |
| 2005/0180315 A1 * | 8/2005 | Chitrapu et al. | | 370/208 |
| 2009/0274281 A1 * | 11/2009 | Cheung et al. | | 379/93.02 |
| 2010/0172296 A1 * | 7/2010 | Singh et al. | | 370/328 |
| 2012/0019379 A1 * | 1/2012 | Ben Ayed | | 340/539.1 |
| 2012/0329473 A1 * | 12/2012 | Ekbatani | | 455/456.1 |

* cited by examiner

*Primary Examiner* — Fayyaz Alam
*Assistant Examiner* — David Bilodeau
(74) *Attorney, Agent, or Firm* — Thomas|Horstemeyer, LLP.

(57) ABSTRACT

Disclosed are various embodiments of pairing with a directional code sequence. In one embodiment a method includes discovering that a user device is within proximity of a pairing device. A directional code sequence based upon variations in the position of the user device is obtained and a communication link is established between the user device and the pairing device in response to the directional code sequence. In another embodiment, a system includes a user device and a pairing device configured to establish a communication link with the user device in response to a sequence of position variations of the user device. In another embodiment, a method includes obtaining a sequence of characters corresponding to a directional code sequence from a pairing device and transmitting a signal from a user device to the pairing device from a sequence of positions corresponding to the sequence of characters.

20 Claims, 4 Drawing Sheets

PAIRING WITH DIRECTIONAL CODE SEQUENCE

BACKGROUND

With the increased availability of smart phones and other portable computing devices, it has become desirable to interface with other host devices. A user enables the link to be established with the host device by selecting an identified device. A known identification key or passkey is keyed in by the user for verification of the device identity before establishing the communication link.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
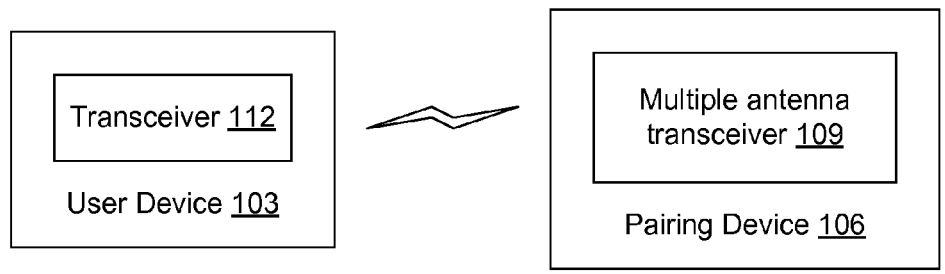
FIG. 1 is a graphical representation of communication between a user device and a pairing device in accordance with various embodiments of the present disclosure.

Disclosed herein are various embodiments of methods and systems related to pairing with directional code sequences. Such embodiments may be used to interface a user device such as, e.g., a cell phone with a pairing device such as, e.g., other portable computing devices or stationary host and/or network devices. Reference will now be made in detail to the description of the embodiments as illustrated in the drawings, wherein like reference numbers indicate like parts throughout the several views.

With reference to FIG. 1, shown is a graphical representation of a user device 103 (e.g., a cell phone, touch pad, laptop computer, portable computing device, wireless communication device, etc.) that may be used to communicate with a pairing device 106 such as, e.g., another user device or a stationary host device or network device (e.g., a television, an automatic teller machine (ATM), video monitor, printer, server, computer, etc.) that utilizes a wireless connection for communication of data and/or control signals. The pairing device 106 includes a multiple antenna transceiver (or receiver) 109 that may be communicatively coupled to a transceiver (or transmitter) 112 of the user device 103 through a wireless link such as, e.g., a WiGig link, a Wi-Fi link, a bluetooth link, or other radio frequency (RF) link. In some embodiments, the transceiver 112 of the user device 103 may also be a multiple antenna transceiver. The multiple antenna transceiver 109 can include a multi-antenna array configured for beam forming and/or directional resolution.

The multiple antenna transceiver 109 allows the pairing device 106 to determine the position of the user device 103. Resolving a sequence of variations or changes in the position of the user device 103 may be used to establish a communication channel (or link) between the user device 103 and the pairing device 106 for communication of information. By determining the mobility of the user device 103, the pairing device 106 may also determine whether the user device 103 is a stationary or mobile device. The configuration of the communication link may be based upon the mobility of the device. Different resources may be allocated to the user device 103 (e.g., communication rate and/or bandwidth) based on the mobility characteristics that are captured during the pairing process. For example, one data rate may be utilized for a mobile device and another higher rate may be used for a stationary device. In other embodiments, the communication rate may be varied based upon the mobility (e.g., speed or velocity) of the mobile device (e.g., different data rates may be associated with different ranges of speed). The pairing device 106 can determine or capture the mobility characteristics of the user device 103 during the pairing process. In some cases, the pairing time may be extended to determine the speed or velocity of the mobile device. The multiple antenna transceiver 109 may also allow the pairing device 106 to identify a plurality of user devices 103 based upon their position with respect to the pairing device 106. The technique is not vulnerable in the presences of interfering pairing requests from a different user devices 103. For example, the pairing device 106 can prioritize the users based at least in part upon authentication codes of the user device 103 and/or proximity to the pairing device 106.

The directional resolution of the pairing device 106 may be used to communicate data such as, e.g., alphabetical or numerical characters based upon the movement of the user device 103 between different spatial segments. By determining the angle of arrival (or direction) of signals from the user device 103 during a series of predefined separation periods or time frames, the pairing device 106 can decipher or decode a spatial signature provided by the user of the user device 103. For example, the space in front of a pairing device 106 may be divided into N spatial segments with each spatial segment corresponding to a character (e.g., numbers, letters, etc.). A user can transmit a series of characters or word from a set of characters (or alphabet) with cardinality N, by only transmitting a signal (e.g., a continuous wave) in each time frame. This may be used to transfer a directional code sequence used to establish a communication link between the two devices 103 and 106 based upon the movement of the user device 103 among the N different spatial segments. In some cases, the communication link may be a secure link based upon the pairing code.

Figure 2:
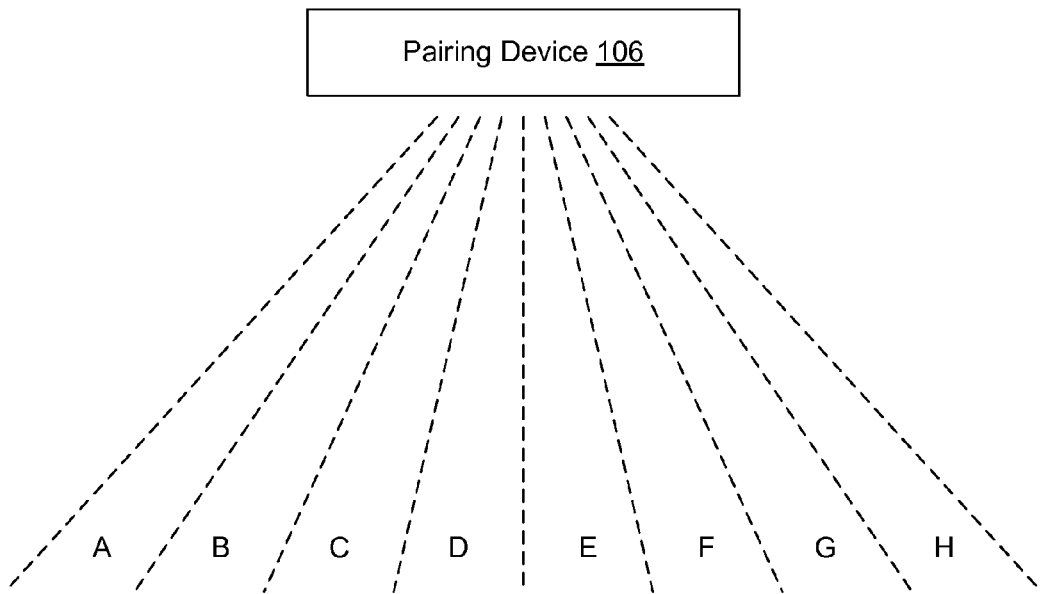
FIGS. 2 and 4 are graphical representations of examples of spatial segmentation by a pairing device of FIG. 1 in accordance with various embodiments of the present disclosure.
Figure 3:
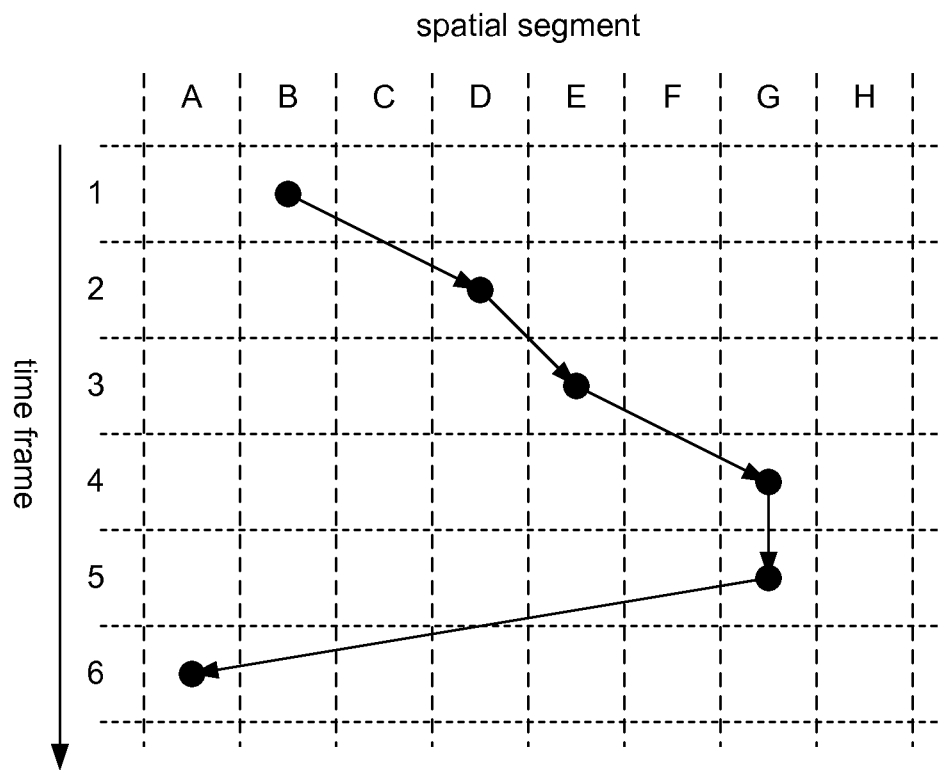

Referring now to FIG. 2, shown is a top view of an example of vertical spatial segmentation that may be provided using the multiple antenna transceiver 109 of the pairing device 106. By resolving the space in front of the pairing device 106 into a plurality of spatial segments (e.g., eight spatial segments that may be identified as 1 through 8 or A through H), a user can send a sequence of characters by only moving the user device 103 sequentially to the corresponding segments in each time frame. For example, a user could send a known directional code sequence such as, e.g., "2-4-5-7-7-1" or "B-D-E-G-G-A" by varying or changing the position of the user device 103 between the spatial segments of FIG. 2 at each time frame as illustrated in FIG. 3. During each time frame, the user device 103 can transmit a signal to the pairing device 106 that can be directionally resolved by the multiple antenna transceiver 109. The signal from the user device 103 may be a continuous wave that is transmitted over the series of time frames of the directional code sequence. In some implementations, the signal may be intermittently transmitted during each time frame. In other implementations, the signal from the user device 103 is transmitted in response to a prompt from the pairing device 106.

Figure 4:
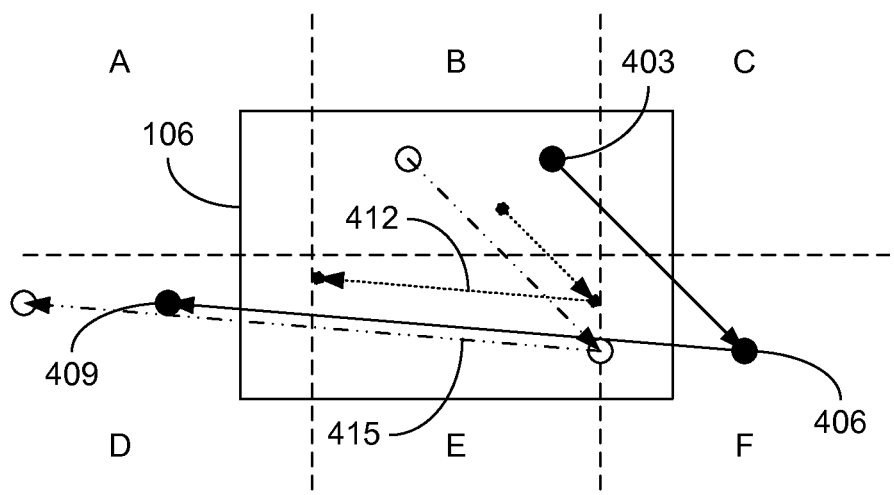

While FIG. 2 illustrates an example of eight vertical segments, other number and orientations such as horizontal segments or a combination of vertical and horizontal segments may be used. FIG. 4 illustrates a front view of an example of six vertical and horizontal spatial segments in a grid fashion by a pairing device. A user could send a directional code sequence such as, e.g., "2-6-4" or "B-F-D" by varying or changing the position of the user device 103 between the spatial segments of FIG. 4 at each time frame as illustrated. During time frame 1, the user device 103 may be held at point 403 while a signal is transmitted to the pairing device 106. The position of user device 103 is then varied to point 406 during time frame 2, followed by moving the user device 103 to point 409 in time frame 3. The sequence of user device positions may be directionally resolved for each time frame by the multiple antenna transceiver 109 and used by the pairing device 106 to verify that a communication link should be established with the user device 103.

As can be seen in the example of FIG. 4, the positioning of the user device 103 within a spatial segment may vary. In some implementations, the multiple antenna transceiver 109 may compensate or adjust for the variation in the positioning of the user device 103. For example, if the movement of the user device 103 is restricted as shown by the sequence 412 or shifted in space as shown by the sequence 415, then the detected positions of the user device 103 may be scaled up or translated over as the relative positions are consistent with the known directional code sequence. The multiple antenna transceiver 109 may also be configured to estimate the corresponding spatial segment when the user device 103 is held along a boundary between two spatial segments based upon, e.g., the overall movement of the user device 103.

Figure 5:
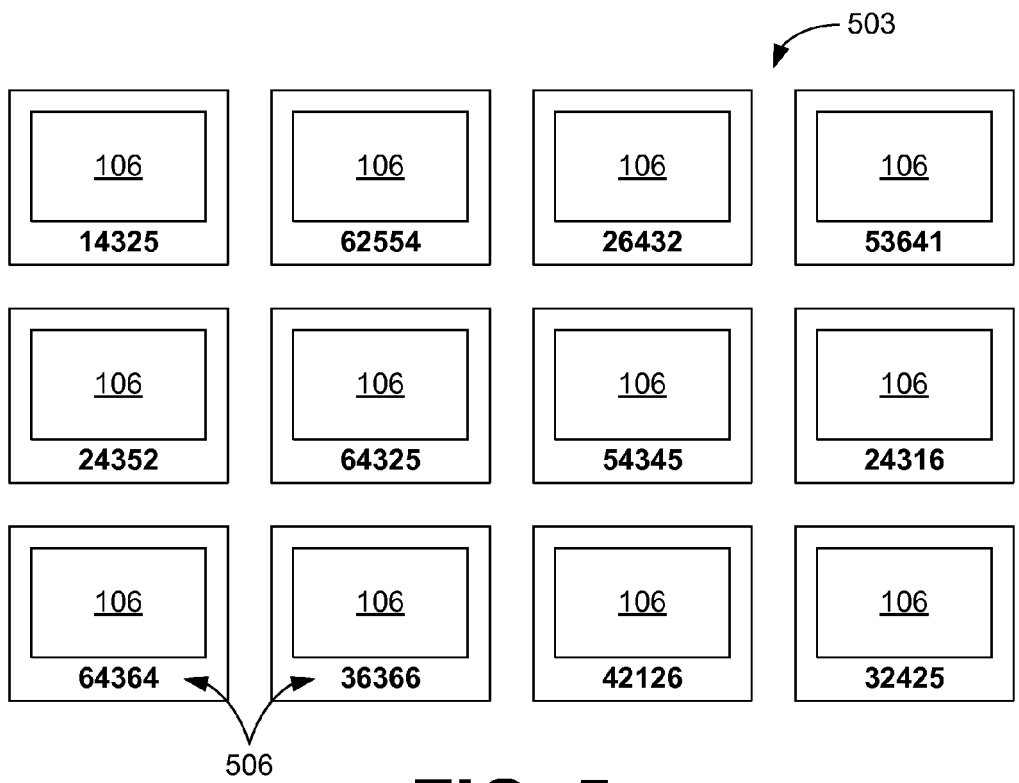
FIG. 5 is a graphical representation illustrating an example of a panel or array of pairing devices of FIG. 1 in accordance with various embodiments of the present disclosure.

The use of directional code sequences allows for the identification of a user device 103 (or one of a plurality of user devices 103) and the establishment of a communication link or channel without the need for physical contact with the pairing device 106. It also allows for selection of one of a plurality of pairing devices 106 by a user of the user device 103. For example, suppose that a panel or array 503 of pairing devices 106 as illustrated in FIG. 5. The pairing devices 106 may include, e.g., monitors, televisions, ATMs, etc. that are configured to allow a user device 103 to establish a communication link with one of the pairing devices 106 based upon a specified directional code sequence corresponding to the pairing device 106. Each pairing device 106 may display 506 a mutually exclusive directional code sequence that corresponds to the pairing device 106. For example, a K-segment display provides a K-character directional code sequence such as, e.g., the five character sequences shown in FIG. 5. In other implementations, the displayed sequence may be arrows (e.g., up, down, left, right, angled to the upper right, etc.) indicating the direction of movement of the user device 103. In some cases, the directional code sequences may be changed on a periodic basis (e.g., every ten seconds). Each pairing device 106 in the panel or array 503 may include a multiple antenna transceiver 109 (FIG. 1) or a common multiple antenna transceiver 109 may be used.

When one of the directional code sequences is detected by the corresponding pairing device 106, then a communication link may be established between the transmitting user device 103 and the pairing device 106. A user can pair with one of the pairing devices 106 by communicating the directional code sequence displayed on that particular pairing device 106 by moving the user device 103 to the corresponding spatial segment while transmitting a signal to the pairing device 106. Upon detecting a spatial sequence that matches with a displayed directional code sequence, the corresponding pairing device 106 can accept pairing and proceed with establishing a communication link with the transmitting user device 103. The same method may be used to release a user device 103 from pairing with the pairing device 106 using the displayed directional code sequence.

Additional security may be provided through polarization of the signals transmitted by a user device 103. The user device 103 may be capable of emitting beams with, e.g., four orthogonal polarizations: vertical (v), horizontal (h), right circular (rc), and left circular (lc). The directional code sequence may be transmitted with a predefined polarization associated with each spatial segment or a predefined sequence of polarization codes. In this way, the pairing device 106 decodes a sequence of ordered pairs instead of a sequence of characters. While directional code sequence may be available to any user who can see the displayed sequence or can observe the movement of the user device 103, the polarization is not visible. By combining polarization with the angle of arrival, an added level of security is included. The pairing device 106 may confirm the directional code sequence and authenticate the user device 103 based upon the predefined polarization per spatial segment. For example, the pairing device 106 may receive a directional code sequence of, e.g., "1 h 3v 4lc 2v." By knowing the predefined polarization sequence, the pairing device 106 can authenticate the identity of the user device 103 to establish, e.g., a secure communication link. The polarization characteristic is not susceptible to eavesdropping since it is not visible to others.

Figure 6:
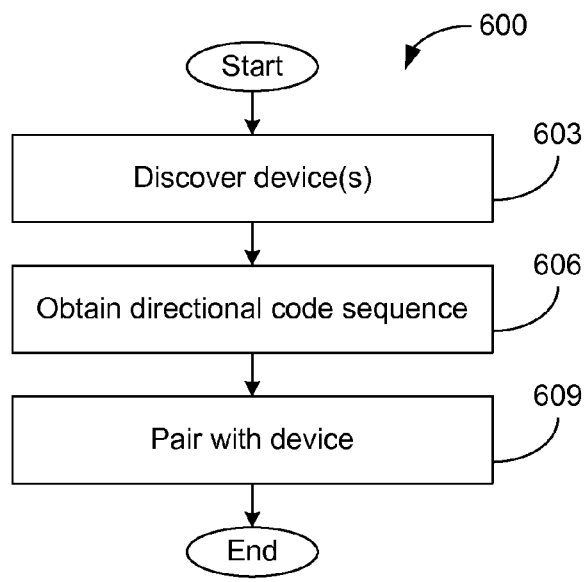
FIGS. 6-8 are flowcharts illustrating examples of pairing between a user device and a pairing device of FIG. 1 in accordance with various embodiments of the present disclosure.

Referring next to FIG. 6, shown is a flowchart 600 illustrating pairing between a user device 103 and a pairing device 106. Beginning with block 603, a pairing device 106 discovers one or more user device(s) 103 in a neighborhood (or within proximity) of the pairing device 106 based upon, e.g., the signal strength and/or transmission capabilities of the user device 103. The neighborhood or proximity may be within a predefined distance of the pairing device 106. In other implementations, the user device 103 may discover one or more pairing device(s) 106 in the neighborhood of the user device 103. Characteristics of the discovered user device(s) 103 and/or pairing device(s) 106 may be identified during discovery.

A directional code sequence is then obtained by the pairing device 106 in block 606. The directional code sequence is provided by varying the position of the user device 103 between predefined spatial segments. The variation between the predefined spatial segments may be in response to a sequence of characters (e.g., numbers, letters, etc.) provided by the pairing device 106. In block 609, the user device 103 is paired with the pairing device 106 based at least in part upon the directional code sequence.

Figure 7:
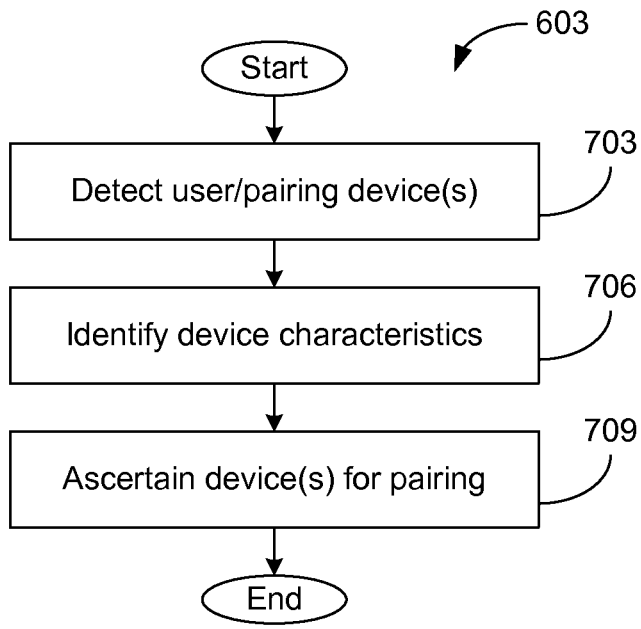

Referring now to FIG. 7, shown is a flowchart illustrating an example of the discovery 603 (FIG. 6) of the user device(s) 103 and/or pairing device(s) 106. Beginning with block 703, one or more user device(s) 103 and/or pairing device(s) 106 are detected. For example, the user device 103 (or pairing device 106) may transmit a signal that may be detected by the pairing device 106 (or user device 103) when in the neighborhood of (or proximate to) the device. The range of the neighborhood may vary based upon the transmission strength and/or sensitivity of the user device 103 and/or pairing device 106. In other embodiments, the pairing device 106 (or user device 103) may broadcast a signal that prompts a user device 103 (or pairing device 106) response. In some implementations, device detection may be limited by the capabilities of the pairing device 106 and/or the user device 103. For example, the pairing device 106 may only detect user devices 103 operating within a specified band.

Characteristics of the detected device 103/106 are then identified in block 706. For example, a certain application of the pairing device 106 (e.g., a printer) may be identified for use by the user device 103 or the pairing device 106 may identify that the user device 103 is capable of utilizing an application offered by the pairing device 106. Other device characteristics may also be identified such as, e.g., security features of the devices 103/106, public keys that may be used to establish a secure communication link using encrypted messages, MAC layer features and capabilities, PHY layer features and capabilities such as, e.g., data rates, frequency band communication capabilities (e.g., 2.4 GHz, 5 GHz, 60 GHz, etc.). A multiple antenna transceiver may also allow for the identification of other device characteristics such as range, angle of arrival (or direction) of signals, signal power, and/or movement of the device 103/106 based upon the change in the angle of arrival and/or range over time. The device movement (or patterns in movement) may be used in determining which devices to pair with and/or whether to pair with a specific device. Each device 103/106 may transmit a message to indicate their characteristics and/or to signal interest in pairing with the other device. Previously paired devices may be identified by a stored address such as, e.g., a MAC address.

In block 709, one or more user device(s) 103 or pairing device(s) 106 are ascertained for pairing using the identified characteristics. Filtering based upon the device characteristics may be used to identify detected devices 103/106 that may be appropriate for establishing a communication link and/or prioritize the detected devices 103/106. Devices 103/106 that do not fit a proper profile may be excluded from pairing or reduced in priority. Filtering may be carried out based upon spatial characteristics of the detected device such as, e.g., range, antenna pattern, mobility, specific Doppler patterns, etc. For example, a paring device 106 may give the closest user device 103 priority for establishing a communication link. In other implementations, a stationary pairing device 106 may exclude devices that are stationary or devices that do not support an application. Ascertaining the user device(s) 103 or pairing device(s) 106 can save user interaction time (e.g., by eliminating the need to choose a device or reducing the devices available from a menu), saving connection time and network resources, and saving battery power by streamlining the pairing process.

For example, a stationary device such as, e.g., an access point (AP) or PBSS control point (PCP) may look for mobile devices to pair with. After the communication link is established, the mobile devices may then be grouped together on a specific frequency to avoid interference with other stationary devices that may employ high throughput streaming data. The same AP or PCP may deliberately pair with other stationary devices (e.g., video monitors, printers, or other APs or PCPs) and move communications to separate links for streaming applications that require significant network bandwidth and low latency. In other cases, a mobile device may filter out stationary devices (e.g., based on range and/or other stationary characteristics) and only pair with another mobile device.

Figure 8:
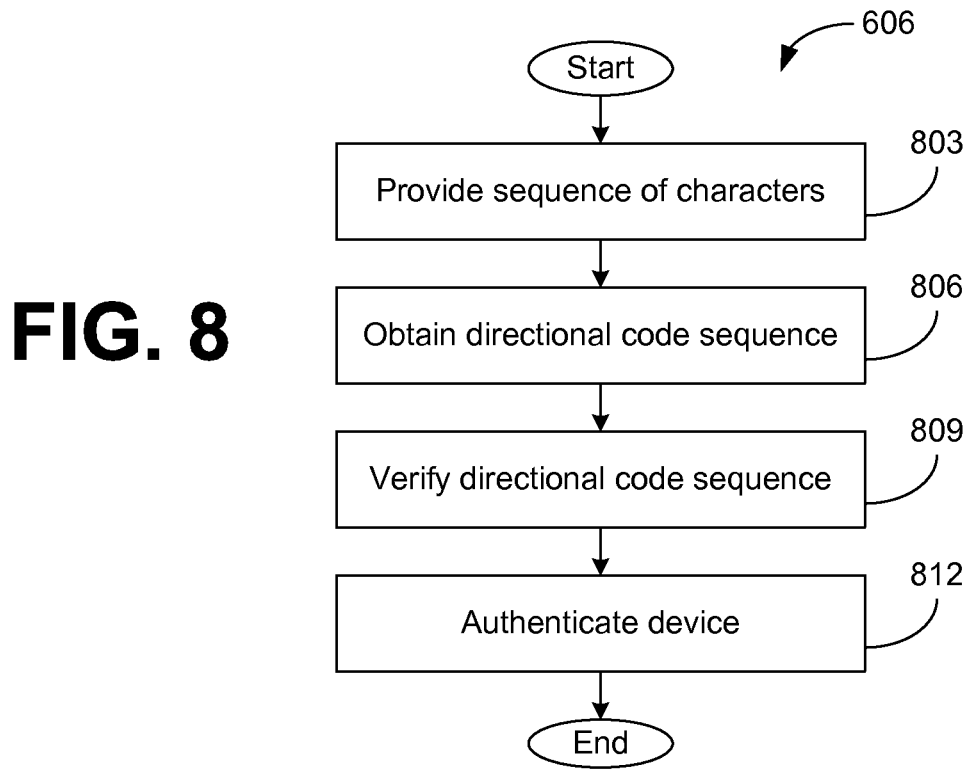

Referring next to FIG. 8, shown is a flowchart illustrating an example of obtaining a directional code sequence 606 (FIG. 6). Beginning with block 803, a sequence of characters (e.g., numbers, letters, etc.) corresponding to a directional code sequence is provided. The sequence may be a known sequence of characters that was previously disseminated. In some implementations, the sequence of characters may be provided by a pairing device 106 through, e.g., a visual display on the pairing device 106 or may be transmitted by the pairing device 106 for display by the user device 103. In block 806, the directional code sequence may be obtained by the pairing device 106 based upon variations in the position of the user device 103. A user moves or transitions the user device 103 among a plurality of predefined spatial segments over a series of time frames as previously discussed. The sequence of user device positions may be directionally resolved based upon the signal transmitted from the user device 103 at each time frame by the multiple antenna transceiver 109 of the pairing device 106 and used to verify the directional code sequence in block 809.

The user device 103 may also be authenticated in block 812 based upon the polarization of the signals obtained at each time frame by the pairing device 106. The sequence of transmitted signals may include a known polarization sequence that may be used to authenticate the user device 103. The polarization provides a non-visible means of transmitting an authentication code. Pairing of the user device 103 and the pairing device 106 (block 609 of FIG. 6) through a communication link may be carried out in response to the directional code sequence. In some cases, a secure communication link may be established based upon the authentication of the user device 103.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a range of "about 0.1% to about 5%" should be interpreted to include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, having thus described the invention, at least the following is claimed:

1. A method, comprising:
   discovering, by processing circuitry of a stationary pairing device, that a handheld user device is within proximity of the stationary pairing device;
   sending, by the processing circuitry, a directional code sequence to the handheld user device;
   obtaining, by the processing circuitry, the directional code sequence from the handheld user device, the directional code sequence based upon predefined variations in position of the handheld user device during a series of predefined time frames; and establishing, by the processing circuitry, a communication link between the handheld user device and the stationary pairing device in response to the directional code sequence.

2. The method of claim 1, wherein the position of the handheld user device is varied between a predefined number of spatial segments.

3. The method of claim 1, wherein obtaining the directional code sequence comprises:
obtaining, during a first time frame of the series of predefined time frames, a signal from the handheld user device in a first position corresponding to a first spatial segment; and
obtaining, during a second time frame of the series of predefined time frames, a signal from the handheld user device in a second position corresponding to a second spatial segment.

4. The method of claim 3, wherein the first and second time frames are consecutive time frames of the series of predefined time frames.

5. The method of claim 3, wherein the first and second spatial segments are vertically displaced.

6. The method of claim 3, wherein the first and second spatial segments are horizontally displaced.

7. The method of claim 1, wherein obtaining the directional code sequence comprises:
obtaining a signal from the handheld user device at each time frame of the series of predefined time frames;
resolving a direction of transmission for each of the obtained signals; and
determining the directional code sequence based at least in part upon the resolved direction of transmission corresponding to each time frame of the series of predefined time frames.

8. The method of claim 7, wherein the each of the obtained signals includes a predefined polarization.

9. The method of claim 8, further comprising authenticating the handheld user device based upon the predefined polarizations over the series of predefined time frames.

10. The method of claim 1, further comprising:
discovering a plurality of user devices within proximity of the stationary pairing device; and
excluding at least one of the plurality of user devices based upon identified characteristics of the at least one user device.

11. A system, comprising:
a handheld user device comprising a transceiver; and
a pairing device comprising a multiple antenna transceiver, the pairing device configured to:
provide a directional code sequence comprising a plurality of characters, each character corresponding to a predefined user device position;
receive a signal transmitted from the handheld user device at each of a sequence of the predefined user device positions, each of the sequence of predefined user device positions corresponding to a respective character of the plurality of characters of the directional code sequence; and
establish a communication link with the handheld user device in response to a sequence of position variations of the handheld user device, the sequence of position variations determined based upon the signal transmitted at each of the sequence of predefined user device positions.

12. The system of claim 11, wherein the pairing device is further configured to resolve a position of the handheld user device during each time frame of a series of time frames based upon the signal transmitted from the handheld user at each of the sequence of the predefined user device positions.

13. The system of claim 12, wherein the signal is transmitted by the handheld user device from each of the sequence of the predefined user device positions during a corresponding time frame of the series of time frames.

14. The system of claim 12, wherein the handheld user device transmits the signal at each of the sequence of the predefined user device positions in response to a prompt from the pairing device.

15. The system of claim 11, further comprising a plurality of pairing devices, each of the plurality of pairing devices configured to provide a unique directional code sequence, wherein each of the plurality of pairing devices is configured to establish a communication link with the handheld user device in response to a different sequence of position variations of the handheld user device corresponding to the unique directional code sequence.

16. The system of claim 11, wherein the pairing device is configured to:
discover a plurality of user devices within proximity of the pairing device; and
prioritize the plurality of user devices based at least in part upon identified characteristics of the user devices.

17. The system of claim 16, wherein the communication link is configured based at least in part upon mobility characteristics of the handheld user device.

18. A method, comprising:
obtaining a sequence of characters from a stationary pairing device, the sequence of characters corresponding to a directional code sequence;
transmitting, via a transceiver of a handheld user device, a signal from the handheld user device to the stationary pairing device, at each position of a predefined sequence of user device positions, each position corresponding to a respective character of the sequence of characters; and
establishing, via the transceiver, a communication link between the handheld user device and the pairing device based at least in part upon verification of the sequence of user device positions.

19. The method of claim 18, wherein the position of the handheld user device is varied based upon a predefined time frame.

20. The method of claim 18, wherein the predefined sequence of user device positions are in a plane comprising vertical and horizontal spatial segments.

* * * * *